(12) United States Patent
Jasperneite et al.

(10) Patent No.: US 6,324,658 B1
(45) Date of Patent: Nov. 27, 2001

(54) APPARATUS FOR SELF-DIAGNOSIS OF SUBSTANTIALLY SPORADIC FAULTS IN SERIAL TRANSMISSION SYSTEMS

(75) Inventors: Jürgen Jasperneite, Steinheim; Detlev Kuschke, Schnieder; Dietmar Schnönherr, Lemgo; Joachim Schmidt, Horn-Bad Meingerg, all of (DE)

(73) Assignee: Phoenix Contact GmbH & Co. (DE)

( * ) Notice: Subject to any disclaimer, the term of this patent is extended or adjusted under 35 U.S.C. 154(b) by 0 days.

(21) Appl. No.: 09/201,310

(22) Filed: Nov. 29, 1998

(30) Foreign Application Priority Data

Nov. 28, 1997 (DE) .............................. 197 52 792

(51) Int. Cl.[7] .................................. G06F 11/273
(52) U.S. Cl. .............................................. 714/43
(58) Field of Search ................... 714/43, 57, 25

(56) References Cited

U.S. PATENT DOCUMENTS

| | | | | |
|---|---|---|---|---|
| 5,357,611 | * | 10/1994 | Kaneshima | 395/200 |
| 5,432,715 | * | 7/1995 | Shigematsu et al. | 364/551.01 |
| 5,500,944 | * | 3/1996 | Yoshida | 714/47 |
| 5,535,192 | * | 7/1996 | Trubey et al. | 370/16.1 |
| 5,748,880 | * | 5/1998 | Ito et al. | 714/46 |

FOREIGN PATENT DOCUMENTS

| | | | | |
|---|---|---|---|---|
| 406236298A | * | 8/1994 | (JP) | G06F/11/30 |
| 401036190A | * | 2/1989 | (JP) | H04Q/9/00 |

* cited by examiner

Primary Examiner—Robert Beausoleil
Assistant Examiner—Scott T. Baderman

(57) ABSTRACT

An apparatus for self-diagnosis of substantially sporadic faults in a serial network which connects a number of subscribers together to a central diagnosis apparatus is characterised in that arranged decentrally at each subscriber (Tln1, ... Tlnn; FIG. 5) at given fault-relevant locations in its protocol stack are fault detectors (FD) which transmit their test results to a diagnosis and report manager (DRM) which from the individual test results of all fault detectors produces a fault picture which it preaddresses for transmission thereof insofar as, for each fault picture to be transmitted to a central diagnosis apparatus (DE) for the purposes of evaluation there, it generates an address (ID-ADR) by means of which it actuates an ID-transmitting-receiving buffer memory (FDSEP) in which it provides for intermediate storage of the fault pictures associated with the addresses and reads them out again in time-displaced relationship for their transmission to the central diagnosis apparatus by way of the transmission network (UN).

6 Claims, 7 Drawing Sheets

APPARATUS FOR SELF-DIAGNOSIS OF SUBSTANTIALLY SPORADIC FAULTS IN SERIAL TRANSMISSION SYSTEMS

The invention relates to an apparatus for the diagnosis of sporadic faults in a serial transmission system network which connects a number of subscribers together to a central diagnosis apparatus.

In the course of increasing decentralisation in the automation of the most widely varying kinds of tasks such as speech, video and data transmission, remote control and regulation and the like by way of networks which are extended in spatial terms with a large number of network subscribers connected thereto, self-diagnosis of a transmission system is an aspect of ever increasing significance. For that reason, apparatuses and processes have already been provided, for implementing self-diagnosis in such apparatuses which are already differentiated in such a way that they automatically notify the network operator of the causes of weaknesses in his system, without in that respect requiring the otherwise normal use of external aids. The basic principle of those systems is that of including all subscribers connected to the network, in the system diagnosis.

Most of the known diagnostic processes and apparatuses are based on central monitoring of the data traffic, in which case the apparatus which controls the monitoring procedure also records the data traffic and attempts to obtain conclusions from such data in regard to the nature and location of a fault which has occurred.

Figure 1:
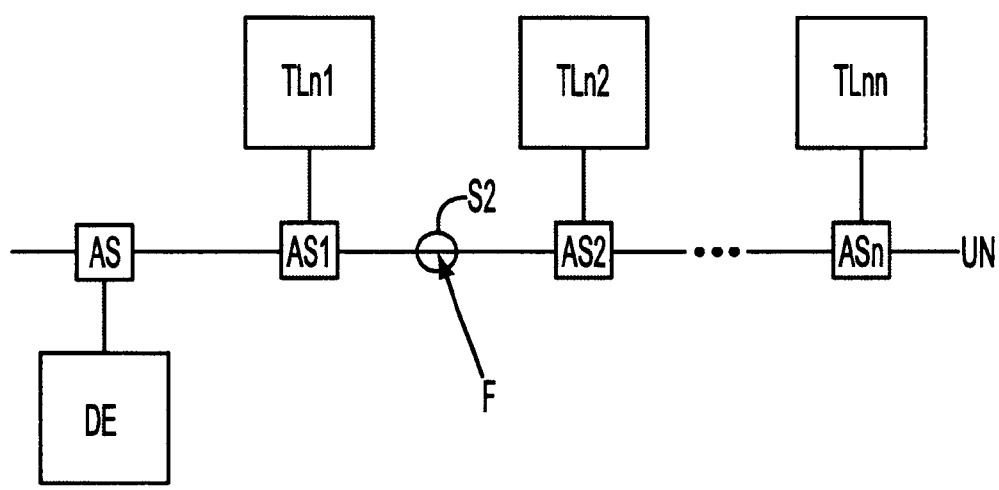

As illustrated in FIG. 1 showing such a known arrangement of a transmission network UN to which all subscribers Tln1 to Tlnn are connected in parallel by means of connecting circuits AS1 to ASn, the diagnosis apparatus DE is provided as a central element for monitoring the data traffic and evaluation of the faults detected, and is also connected to the transmission network UN by way of its connecting circuit AS.

As FIG. 1 shows, there is a problem here if a sporadic fault F occurs at the location S2, that is to say on the portion of the transmission network UN which connects the subscribers Tln1 and Tln2 together. Sporadic faults such as for example stochastic break-ins of noise or interference signals or discharges of electrostatic overvoltages in the transmission networks have the unpleasant characteristic that they generally occur only for a brief period of time and in that case also completely asynchronously. That means that it is admittedly possible for the diagnosis apparatus DE to detect the fault, but it is not possible to locate the position at which it occurs between the subscriber Tln1 and the subscriber Tln2.

Figure 2:
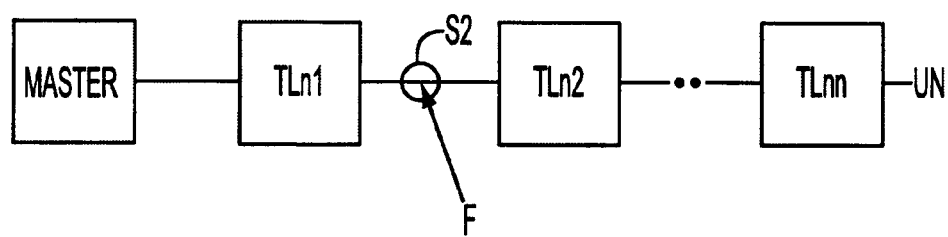

For that reason another system has also been developed, the principle of which is shown in FIG. 2 and which avoids the disadvantage just set out above. This involves a so-called master/slave system. In a master/slave system, after a fault F is detected, the master implements a diagnosis run in order to locate the position of the fault. In that procedure, the fault location S2 of a sporadic fault, in contrast to a hard fault, can however be ascertained only when it is still active during the diagnosis run. If the fault has disappeared before that, then this procedure no longer affords any possible way of determining the location of the fault. Presumably also the information about the nature of the fault can also no longer be obtained.

Although systems with active subscriber coupling, as in FIG. 2, afford the best requisites for differentiated fault diagnosis, the disturbances and the location at which they occur can no longer be located if they fall into a dead zone which begins where the network update time (NUT) is no longer to be maintained ($t_{NUT}$) due to the influence of the fault, and terminates at the time which is necessary for a diagnosis run. This means that all faults which, from the point of view of their fault-action time, fall into that dead zone, can no longer be located, due to the principle involved.

Figure 3:
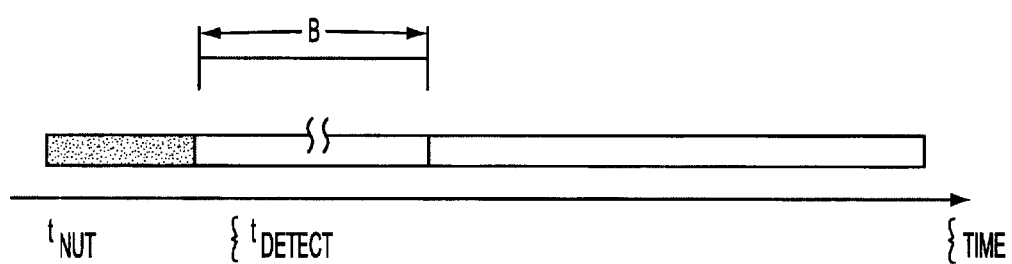

FIG. 3 shows the band width B of a non-locatable fault which falls into the dead zone with the above-mentioned time limits.

As even processes and apparatuses which are based on the above-discussed principle do not permit the location of sporadic faults or disturbances in all cases, the use thereof in diagnosis apparatuses which with absolute reliability are required to recognise all sporadic faults that occur, because specific uses require that, is not appropriate for uses of that kind.

Therefore the object of the present invention is to provide a diagnosis apparatus which can detect and locate all disturbances that occur and is thus suitable for uses involving the highest levels of demand in terms of quality in regard to safeguard against faults.

That object is attained by the features recited in claim 1. Further advantageous configurations and developments of the subject-matter of the invention are to be found in the appendant claims.

That affords the possibility of implementing gap-less and continuous fault diagnosis in transmission networks even for sporadic faults.

Figure 4:
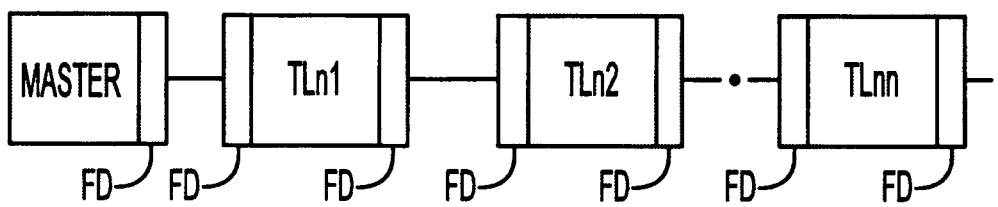
Figure 5:
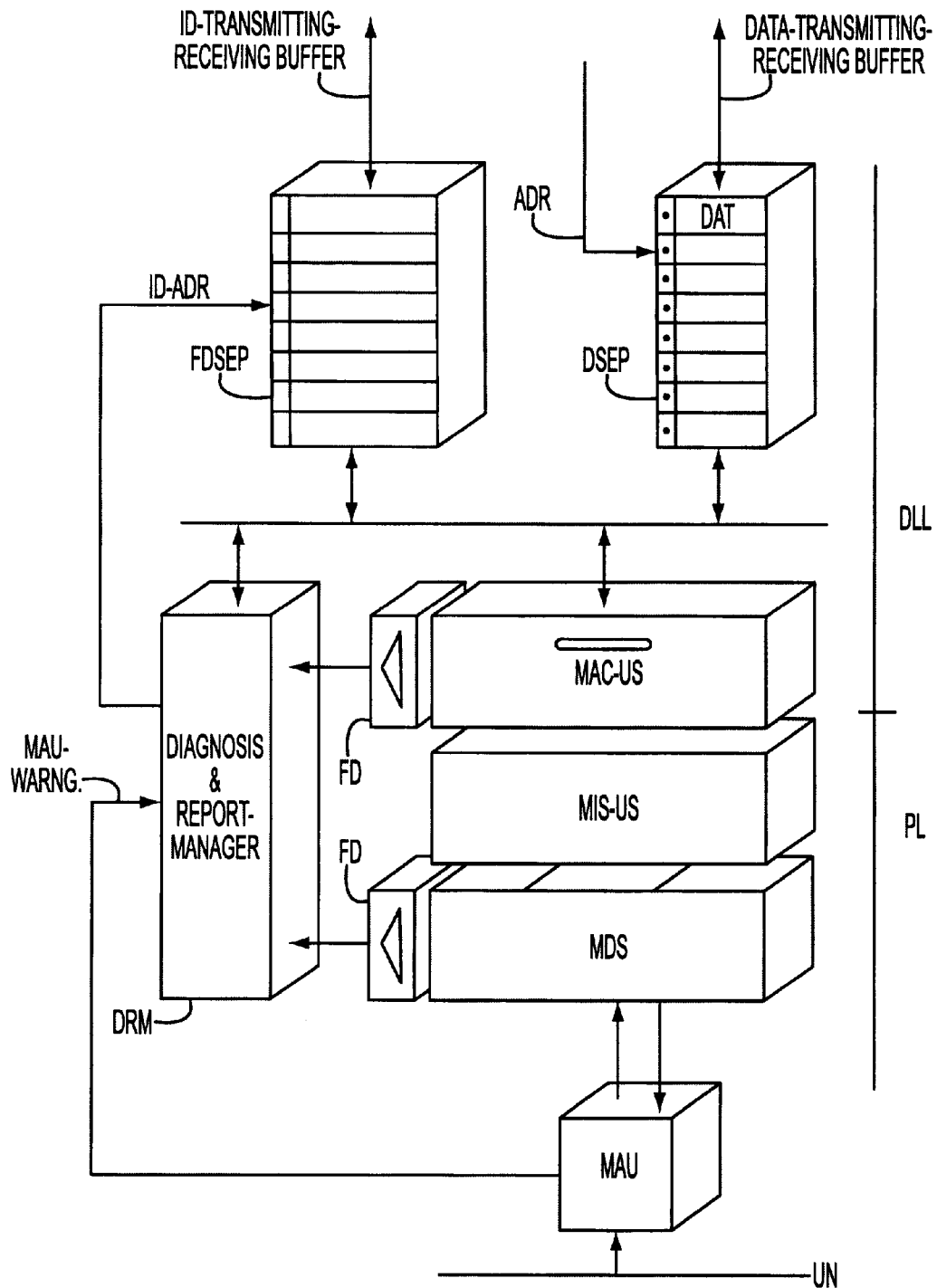
Figure 6:
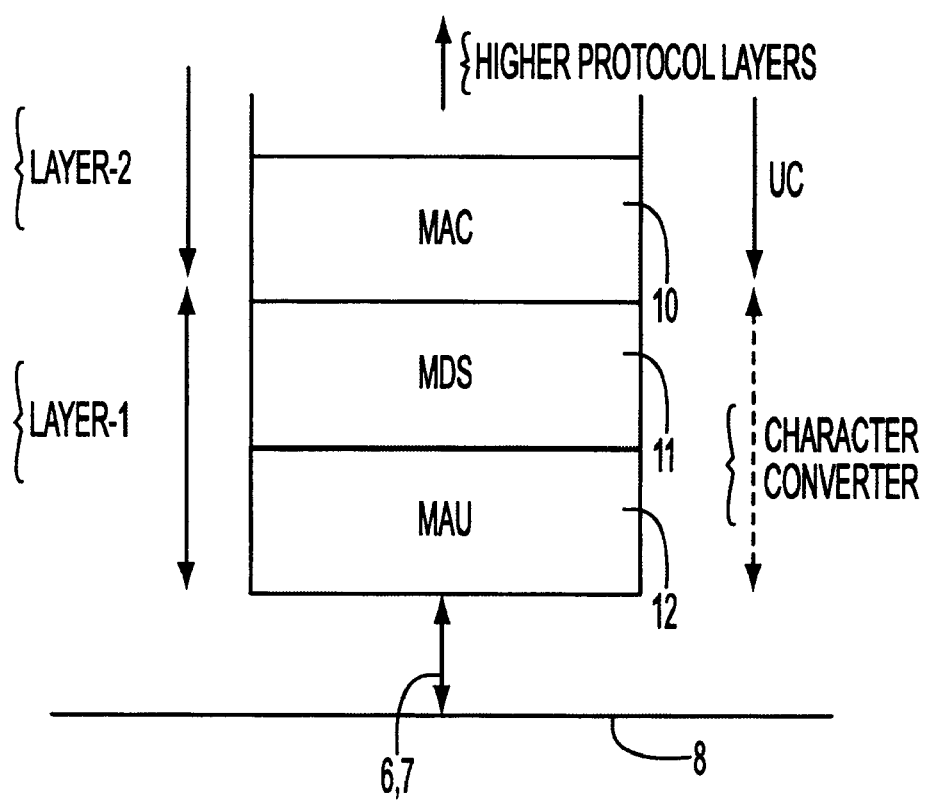
Figure 7:
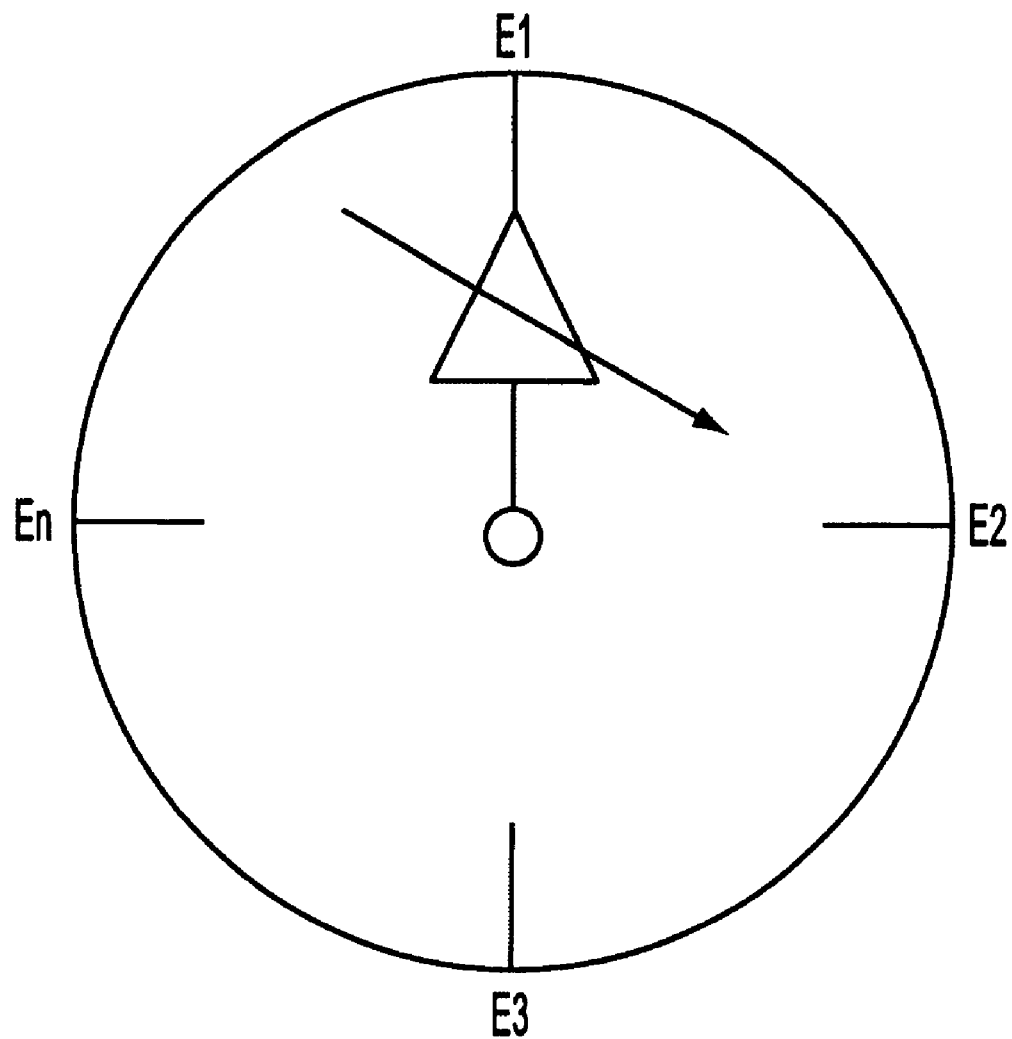

The invention is described in detail hereinafter with reference to the accompanying drawings in which:

FIG. 1 shows the principle of a network with a linear bus structure and a central diagnosis apparatus, FIG. 2 illustrates the principle of a master/slave network system with active coupling of the subscriber devices, FIG. 3 illustrates the principle of the band width of a non-locatable disturbance, FIG. 4 illustrates the principle of a distributed network system with dedicated fault detectors in accordance with the invention, FIG. 5 illustrates the principle of the protocol structure of a decentral subscriber in accordance with the ISO/OSI-reference model, FIG. 6 illustrates the principle of a part of a protocol stack, and FIG. 7 is a diagrammatic view of the procedure involved in processing events with low priority in cyclic succession.

Described hereinafter is the principle according to the invention, which avoids the above-mentioned disadvantages of known processes and arrangements for fault diagnosis in distributed networks.

The basis for that principle is that the faults or disturbances are no longer detected by a central diagnosis apparatus, as is the case with the above-described known apparatuses and processes, but decentrally at each subscriber in that network.

The simultaneous storage of the faults in all subscriber devices, which becomes possible as a result, eliminates the dead zone in which faults could not be detected.

In order to implement this, as shown in FIG. 4, provided in each subscriber device and the master device are fault detectors FD which decentrally effect fault checking operations at the different protocol levels, typically at the layer-1 and the layer-2 of a total of seven protocol layers of the transmission process used.

In that respect FIG. 6 shows a portion from the protocol stack of a field bus protocol. In this respect the character converter 5 takes over the tasks of the MDS (Medium Dependent Sublayer) 11 and optionally the tasks of the MAU (Medium Attachment Unit) 12.

MAU 12 and MDS 11 together form the physical layer which, as already referred to above, is also called the layer-1. Above the MDS 11 begins the safeguard layer (Data Link Layer) DLL, also referred to as layer-2, with its subcomponent MAC (Medium Access Control) 10. The layer-1 and the layer-2 generally exchange character-oriented physical protocol data units (PhPDU). That interface is physically pronounced in the present invention and represents the serial interface 2 in FIG. 1. If the information content of the PhPDU of the serial interface 2 is smaller than that of the MDS 11 of the field protocol used, suitable introductory control protocol units PDU are to be defined, which classify an interrelated sequence of PhPDUs.

Preferably the above-mentioned fault detectors FD are integrated directly into the circuits available for a transmission protocol. Detected fault conditions on the transmission medium or in a protocol layer are detected by suitable detectors at the reception circuits of the subscribers and stored. If a network subscriber has a plurality of reception circuits, it then also has correspondingly more detectors. That is for example the case when full duplex transmission between two adjacent subscribers is implemented.

FIG. 5 now shows a typical protocol structure of a network subscriber, illustrating here only the layers which are of interest, more specifically the physical layer PL, that is to say layer-1, and the safeguard layer (Data Link Layer) DLL, that is to say the layer-2. It will be seen that fault detectors FD are arranged at the corresponding protocol layers, the MAC-US (Medium Access Control) sublayer of DLL and at the MDS (Medium Dependent Sublayer)-layer of PL which between MAC-US and MDS also has a further sublayer MIS-US (Medium Independent Sublayer). Finally the unit MAU (Medium Attachment Unit) represents a bidirectional connection of MDS with the transmission network UN.

Layer-1 and layer-2 are the essential carriers of the hardware of the apparatus shown in FIG. 5 and they can therefore also be checked with hardware fault checking circuits which are arranged deep in the logic structure at 'neuralgic', that is to say fault-relevant, points.

While the essential tasks of the layer-1 are establishing the definitions for transmission (medium, baud rate, voltage supply and the like), the transmission process and presetting factors such as pin-occupations and connections, they also define the signal levels for the encoding of individual bits.

The layer-2, the safeguard layer, describes the bus access process, and data safeguard, bridges and normal switches also operate on this protocol layer.

Transmission systems nowadays generally have a transmission channel for network management signals (network management functions). For reasons of transmission efficiency that channel should be little used during the transmission of (useful) data, for example by minimising the time allocated to it for the transmission of management signals. That can be achieved for example by allocating to each network subscriber a fixed time slot in which it can transmit its management signals, more specifically only in that time slice. When dealing with longer signal sequences the transmission thereof then has to be distributed to a plurality of time slices.

As the number of data widths required therefor, for a differentiated fault message, exceeds the usual capacities of a management channel, there is provided a diagnosis and report manager (DRM) which operates as an information collecting and distributing means and which performs its task by encoding a fault image or picture from the available items of information from the fault detectors FD (generally only one fault bit per fault detector). That fault picture of a network subscriber is then (for example in its time slice allocated thereto) transmitted by way of the transmission network UN to another central network station, for example a master.

The particularity in regard to the diagnosis and report manager DRM is that for example the master (busmaster) no longer has to address and interrogate the diagnosis information, for example the fault picture, of the decentral network subscriber, but that now the decentral DRM present at the network subscriber pre-addresses the fault picture to be notified and/or an item of status information in the form of an event E, for example a condition of a subscriber function which is to be monitored, so that the most up-to-date fault information is automatically transmitted.

As FIG. 5 shows, the address of an identification ID (ID-ADR) is produced by the DRM and transmitted to an ID-transmitting-receiving buffer memory FDSEP from which then in its time slice the ID and also the fault pictures are transmitted to the master (not shown) by way of UN. So that the item of fault information which is always the most up-to-date is transmitted, buffer operation is implemented in accordance with the known LIFO-principle (LIFO=last in/first out). The useful data are transmitted on to the UN by way of a data memory referred to as the data transmitting-receiving buffer memory DSEP. The address ID can be transmitted in parallel with the data or as a header serially with the data.

Besides the fault influences which generally result in transmission faults, there are in such networks also other items of information which admittedly do not result in transmission disturbances, but which nonetheless must be signalled in parallel with the useful data transmission. Those items of information concern messages about internal conditions or statuses of the individual network subscribers, so-called status information.

A further particularity is derived therefrom, as the DRN is to be capable of distinguishing between items of information of high priority and items of information of low priority. Items of high-priority information are the above-described influences which result in transmission faults while items of low-priority information relate for example to peripheral messages such as failure of a peripheral voltage, expiry of a monitoring timer (watchdog), failure of an external processor (CPU), drop in the transmission quality (MAU warning) and the like. The MAU (Medium Attachment Unit) is a component of the physical layer PL which makes the physical coupling between the medium and the protocol stack.

In order to implement that priority diagram, all items of low-priority information which represent the above-mentioned events E acquire the same priority.

In order to prevent a large number of events of a message blocking the transmission of other messages, then, as shown in FIG. 7, after each message of an event El has been effected in the manner of a clock, the next message is interrogated. That guarantees transmission of all events El, . . . , EN.

That sequence involved in the transmission of items of low-priority information is interrupted by the occurrence of a high-priority event in the manner of an interrupt processing procedure in which after termination of transmission of the message of the high-priority event which can result in defective transmission, the flow pattern shown in FIG. 7 is continued at the interrupted location.

The transmission of the fault and status messages (event messages) should have the least possible influence on the transmission of useful data. Known transmission systems, such as for example an interbus, by virtue of their cyclic mode of operation, afford the possibility of installing on each subscriber network a mechanism which permits the transmission of the above events only in a given pattern of n-valid useful data transmissions (for example n=16). That means that the transmission both of the asynchronous fault messages of a subscriber network and also all other subscriber networks are synchronised to a fixed pattern of n transmission cycles. As a result the transmission network band width available is put to optimum use for those events. Furthermore the determinability of the useful data transmissions can remain safeguarded and preserved by adaptation of the pattern.

What is claimed is:

1. Apparatus for self-diagnosis of substantially sporadic faults in a serial network which connects a number of subscribers together to a central diagnosis apparatus, characterised in that arranged decentrally at each subscriber (Tln1, ... Tlnn; FIG. 5) at given, fault-relevant locations in its protocol stack, are fault detectors (FD) which transmit their test results to a diagnosis and report manager (DRM) which from the individual test results of all fault detectors produces a fault picture which it pre-addresses for transmission thereof insofar as, for each fault picture to be transmitted to a central diagnosis apparatus (DE) for the purposes of evaluation there, it generates an address (ID-ADA) by means of which it actuates an ID-transmitting-receiving buffer memory (FDSEP) in which it provides for intermediate storage of the fault pictures associated with the addresses and reads them out again in time-displaced relationship for their transmission to the central diagnosis apparatus by way of a transmission network (UN).

2. Apparatus according to claim 1 characterised in that to ensure a useful data transmission of maximum size allocated to each subscriber (Tln1, ... , Tlnn) is its own time slot in which it transmits its fault pictures to the central diagnosis apparatus (DE).

3. Apparatus according to claim 1 characterised in that transmitted between the subscribers (Tln1, ... , Tlnn) and the central diagnosis apparatus (DE) is information which includes both fault pictures and also status information for the implementation of system management functions, wherein the fault picture information is allocated a higher priority for the transmission thereof to the central diagnosis apparatus (DE), than the status information for the transmission thereof from the diagnosis and report manager (DRM).

4. Apparatus according to claim 1 characterised in that low priority is always allocated to various items of status information (El, ..., En; FIG. 6), wherein the items of status information pending for transmission are transmitted successively in a cyclic succession (for example E1, E2, E3, ..., En).

5. Apparatus according to claim 1 characterised in that there is provided an apparatus in the transmission system, which allows asynchronously occurring items of status information of the various subscribers (Tln1, ... , Tlnn) in a given pattern of n-valid useful data transmissions, so that all items of status information of all subscribers are synchronised to a fixed transmission pattern.

6. Apparatus according to claim 1 characterised in that the fault detectors (FD) are preferably provided in the physical layer (PL) and the link layer (DLL) of an ISO/OSI-reference model for standardised transmission on distributed networks (UN).

* * * * *